(12) United States Patent
Jin

(10) Patent No.: US 9,939,895 B2
(45) Date of Patent: *Apr. 10, 2018

(54) IMAGE DISPLAYING SYSTEM

(71) Applicants: Shanghai AVIC OPTO Electronics Co., Ltd., Shanghai (CN); Tianma Micro-Electronics Co., Ltd., Shenzhen (CN)

(72) Inventor: Huijun Jin, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 208 days.

This patent is subject to a terminal disclaimer.

(21) Appl. No.: 14/975,590

(22) Filed: Dec. 18, 2015

(65) Prior Publication Data

US 2016/0379345 A1    Dec. 29, 2016

(30) Foreign Application Priority Data

Jun. 29, 2015    (CN) .......................... 2015 1 0372457

(51) Int. Cl.
| | |
|---|---|
| *G06F 3/01* | (2006.01) |
| *G09G 5/00* | (2006.01) |
| *H04N 3/23* | (2006.01) |
| *H04N 5/21* | (2006.01) |

(52) U.S. Cl.
CPC .............. *G06F 3/013* (2013.01); *G09G 5/00* (2013.01); *H04N 3/23* (2013.01); *H04N 5/21* (2013.01)

(58) Field of Classification Search
CPC .............. G06T 3/40; G06T 5/006; H04N 3/23
See application file for complete search history.

(56) References Cited

U.S. PATENT DOCUMENTS

| | | | |
|---|---|---|---|
| 2013/0278486 | A1 | 10/2013 | Duerksen et al. |
| 2013/0321260 | A1 | 12/2013 | Joo |
| 2014/0008442 | A1 | 1/2014 | Yamaguchi |
| | | (Continued) | |

FOREIGN PATENT DOCUMENTS

| | | |
|---|---|---|
| CN | 1549240 A | 11/2004 |
| CN | 101027679 B | 8/2007 |
| CN | ZL200480043955 B | 4/2010 |

*Primary Examiner* — Antonio A Caschera
(74) *Attorney, Agent, or Firm* — Faegre Baker Daniels LLP

(57) ABSTRACT

An image displaying system includes: a display device, a detection device and an image compensating chip. The detection device obtains position information of a view point relative to the display device, and an angle of sight line; the image compensating chip divides equally the image to be displayed into a plurality of first sub-images along a first reference direction, calculates a compensation ratio along the first reference direction for each first sub-image, and compensates each first sub-image along the first reference direction; the first virtual section line segment has two endpoints located on the frame of the display device, is extended along the first reference direction, and passes through an intersection of the sight line and the display device; the display device displays the compensated image, so that the compensated first sub-images are viewed as having the same size along the first reference direction.

13 Claims, 8 Drawing Sheets

(56) References Cited

U.S. PATENT DOCUMENTS

2014/0184656 A1* 7/2014 Tian .................. G09G 3/36
                                                    345/690
2016/0379601 A1* 12/2016 Jin ................... G09G 5/14
                                                    345/667

* cited by examiner

IMAGE DISPLAYING SYSTEM

CROSS-REFERENCE TO RELATED APPLICATION

This application claims priority to Chinese Application No. 201510372457.X, filed Jun. 29, 2015, which is herein incorporated by reference in its entirety.

TECHNICAL FIELD

The present disclosure relates to the field of display technologies and, in particular, to an image displaying system.

BACKGROUND

At present, electronic display devices have been widely employed in various electronic appliances, such as a liquid crystal television, a liquid crystal display, a digital poster board, a laptop computer, a personal digital assistant (PDA), a mobile phone, a digital camera and an electronic book reader.

When viewing a flat display device laterally, a viewer will get an experience that the image displayed on the flat display device has been deformed. For example, as shown in FIG. 1, an image on the flat display device, which is viewed as a rectangle image from a front side, will be viewed as a trapezoidal compressed image from a lateral side. For some flat display devices that cannot be viewed from a front side thereof in use, for example, a rectangular semitransparent display device provided on a car windshield, an image on the display device viewed by a viewer is deformed, as shown in FIG. 2. In another example, for a non-flat display device, such as a flexible display device that is adhered to a curved wall, an image on the non-flat display device is viewed as distorted at any view angle. Because the image displayed by the display device is deformed in the above situations, the display effect of the display device is degraded.

SUMMARY

The present disclosure provides an image displaying system, in order to avoid the case that the displayed image is viewed as deformed when the display device is viewed from a lateral side or when the display device is distorted, so that the compensated image is viewed at the view point as having an undistorted size along a given direction.

Embodiments of the disclosure provide an image displaying system, which includes:
a display device, a detection device and an image compensating chip; where
the detection device is located on a frame of the display device, and is configured to obtain position information of a view point relative to the display device, and an angle of sight line;
the image compensating chip is located on a driver panel of the display device, and the image compensating chip is configured to divide equally the image to be displayed into a plurality of first sub-images along a first reference direction, calculate a compensation ratio along the first reference direction for each first sub-image of the image according to the position information of the view point relative to the display device, the angle of sight line and the parameter information of a first virtual section line segment of the display device, and compensate each first sub-image of the image along the first reference direction; where the first virtual section line segment has two endpoints located on the frame of the display device, is extended along the first reference direction, and passes through an intersection of the sight line and the display device;
the display device is configured to display the compensated image, so that the compensated first sub-images are viewed at the view point as having the same size along the first reference direction.

In the disclosure, the detection device obtains position information of a view point relative to the display device, and an angle of sight line, the image compensating chip divides equally the image to be displayed into a plurality of first sub-images along a first reference direction, calculates a compensation ratio along the first reference direction for each first sub-image of the image according to the position information of the view point relative to the display device, the angle of sight line and the parameter information of a first virtual section line segment of the display device, and compensates each first sub-image of the image along the first reference direction; and the display device displays the compensated image, so that the compensated first sub-images are viewed at the view point as having the same size along the first reference direction, thus avoiding the case that a displayed image is viewed as deformed when a display device is viewed laterally or is distorted in the related art.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
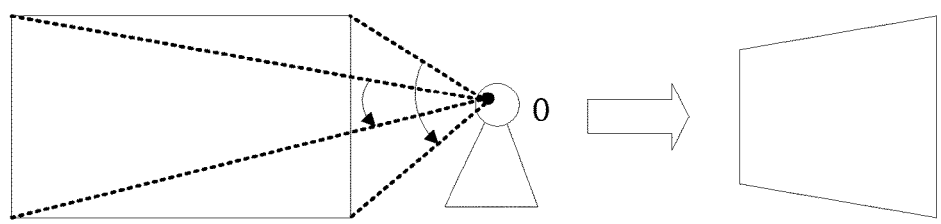
FIG. 1 is a schematic diagram showing a deformation of an image when viewed from a lateral side thereof (i.e. sideways) in the related art.
Figure 2:
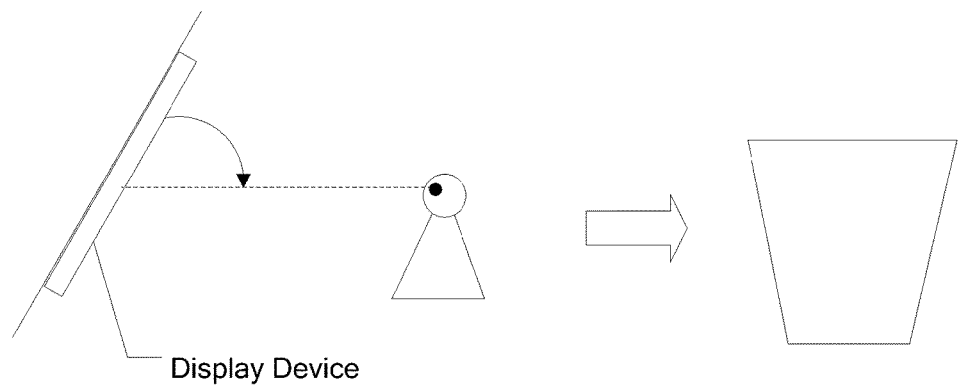
FIG. 2 is a schematic diagram showing a deformation of a displayed image caused by distortion of the display device in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be further illustrated in detail below in conjunction with the drawings and embodiments. It may be understood that, the specific embodiments described here are only used for explaining the disclosure, rather than limiting the disclosure. Additionally, it should be noted that, for sake of description, only those parts related to the disclosure, rather than the whole structure, are shown in the drawings.

Figure 3:
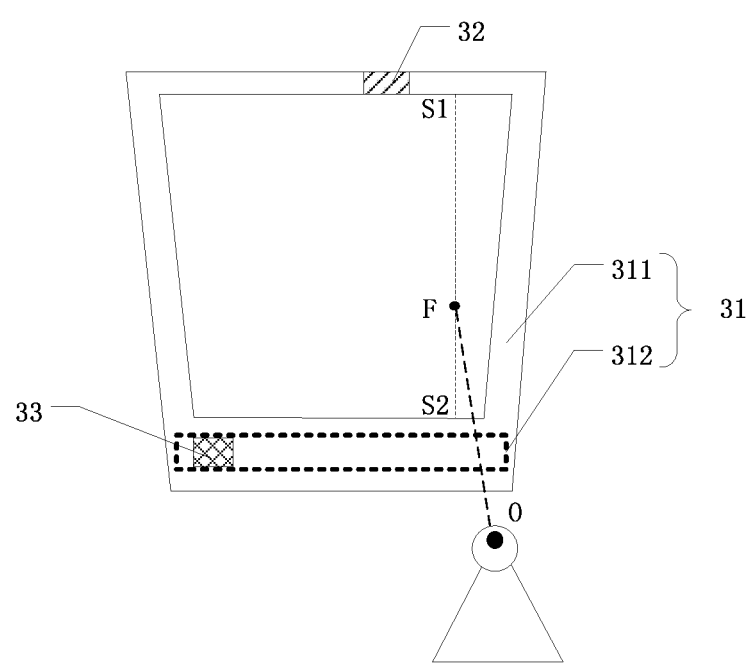
FIG. 3 is a schematic diagram showing a structure of an image displaying system, according to embodiments of the disclosure.

Embodiments of the disclosure provide an image displaying system, and FIG. 3 is a schematic diagram showing a structure of the image displaying system, according to embodiments of the disclosure. As shown in FIG. 3, the system includes: a display device 31, a detection device 32 and an image compensating chip 33; where the detection device 32 is located on a frame 311 of the display device 31, and is configured to obtain position information of a view point O relative to the display device 31, and an angle of sight line; the image compensating chip 33 is located on a driver panel 312 of the display device 31, and the image compensating chip 33 is configured to divide equally the image to be displayed into a plurality of first sub-images along a first reference direction, calculate a compensation ratio along the first reference direction for each first sub-image of the image according to the position information of the view point O relative to the display device, the angle of sight line and the parameter information of a first virtual section line segment S1S2 of the display device, and compensate each first sub-image of the image along the first reference direction; where the first virtual section line segment S1S2 has two endpoints located on the frame of the display device, is extended along the first reference direction, and passes through an intersection F of the sight line OF and the display device 31; the display device 31 is configured to display the compensated image, so that the compensated first sub-images are viewed at the view point O as having the same size along the first reference direction.

The parameter information of the first virtual section line segment S1S2 of the display device may include information such as the length of the first virtual section line segment, coordinates of endpoints of the first virtual section line segment, and the equation of the first virtual section line segment. Illustratively, in the case of the flat display device adhered to a car windshield, a viewer is at a lateral side relative to the display device and views the display device sideways, and hence the display device is selected as a flat display device in FIG. 3; however, the disclosure is not limited thereto, for example, the display device may be a flat display device or a curved surface display device.

Figure 4:
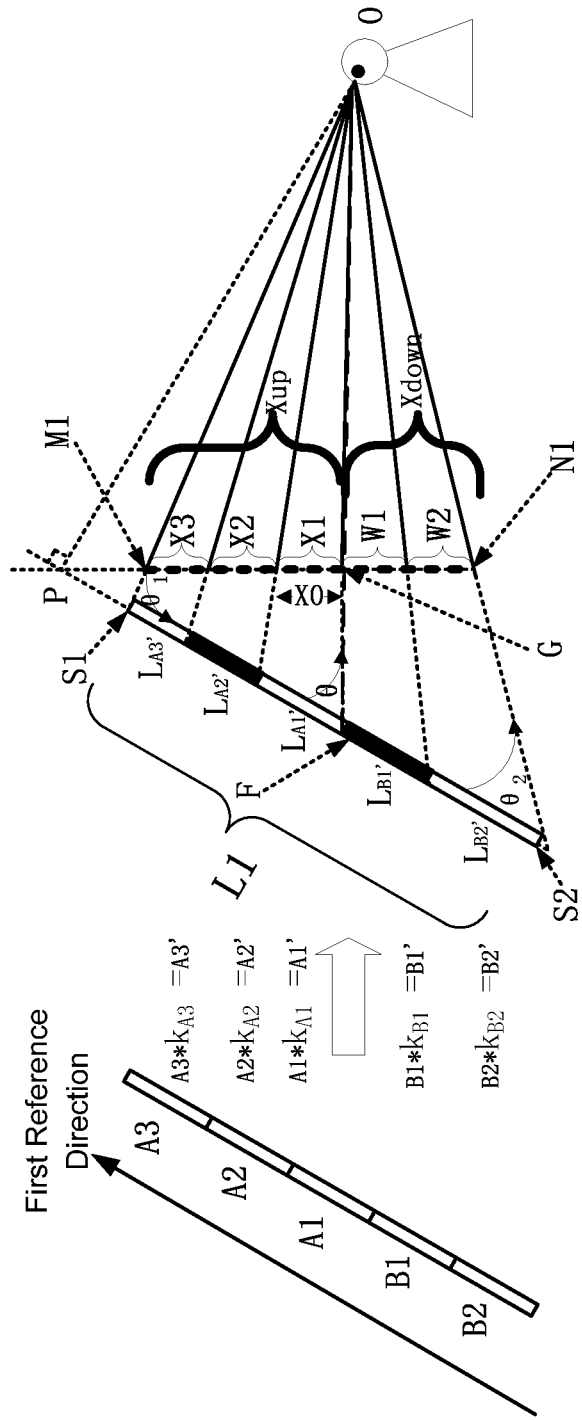
FIG. 4 is a schematic diagram showing a sectional view taken along a first virtual section line segment S1S2 in FIG. 3.

FIG. 4 is a schematic diagram showing a sectional view taken along the first virtual section line segment S1S2 of FIG. 3. As shown in FIG. 4, illustratively, the image compensating chip firstly divides equally the image to be displayed into five first sub-images B2, B1, A1, A2 and A3 along the first reference direction, and the lengths of the five first sub-images B2, B1, A1, A2 and A3 along the first reference direction are identical and are represented by X0. The number of the first sub-images is not limited in the embodiments of the disclosure, and generally, the higher the number of the first sub-images of the image is, the finer the image as displayed will be, and the better the display effect of a curved display device will be. Then, the position information of a view point O relative to the display device 31, and an angle of sight line are obtained by the detection device 32 located on the frame 311 of the display device 31, and subsequently the image compensating chip 33 calculates the compensation ratio along the first reference direction for each first sub-image of the image according to the position information of the view point O relative to the display device 31, the angle of sight line and the parameter information of the first virtual section line segment S1S2 of the display device 31, and compensates each first sub-image of the image along the first reference direction, and then the display device 31 displays the compensated image, so that the compensated first sub-images are viewed at the view point O as having the same size along the first reference direction. As shown in FIG. 4, the compensation ratios along the first reference direction for the first sub-images B2, B1, A1, A2 and A3 are calculated as $k_{B2}$, $k_{B1}$, $k_{A1}$, $k_{A2}$ and $k_{A3}$, respectively, so that compensated first sub-images B2', B1', A1', A2' and A3' are obtained through multiplying the lengths of the first sub-images B2, B1, A1, A2 and A3 along the first reference direction by the corresponding compensation ratios $k_{B2}$, $k_{B1}$, $k_{A1}$, $k_{A2}$ and $k_{A3}$ along the first reference direction. Referring to FIG. 4, the compensated first sub-images B2', B1', A1', A2' and A3' are viewed at the view point O as having the same size along the first reference direction. At this time, the actual lengths of the compensated first sub-images B2', B1', A1', A2' and A3' displayed by the display device along the first reference direction are represented by $L_{B2'}$, $L_{B1'}$, $L_{A1'}$, $L_{A2'}$ and $L_{A3'}$, respective, where $L_{B2'} \neq L_{B1'} \neq L_{A1'} \neq L_{A2'} \neq L_{A3'}$. However, the compensated first sub-images are viewed at the view point O as having the same length along the first reference direction, that is, the eyes of the viewer at the view point perceive that the compensated first sub-images B2', B1', A1', A2' and A3' have the same length X0 along the first reference direction, thereby avoiding the case that the displayed image is viewed as deformed when the display device is viewed laterally or is distorted. Because the angle of sight line is involved in the above calculation, the case that an image displayed on a display device is viewed deformed when the display device is laterally viewed may be avoided by the above system regardless of whether the viewer aims at the center of the display device or not.

Based on the above embodiments, the size of each compensated first sub-image of the image along the first reference direction is larger than or equal to the size of one sub-pixel of the display device along the first reference direction. In such configuration, advantageously, each compensated first sub-image of the image can be completely displayed on the display device, thus avoiding the problem that some region cannot be displayed since the compensated first sub-image of the image is smaller than the size of one sub-pixel, because the first sub-images equally divided from the image along the first reference direction are excessive.

Figure 5:
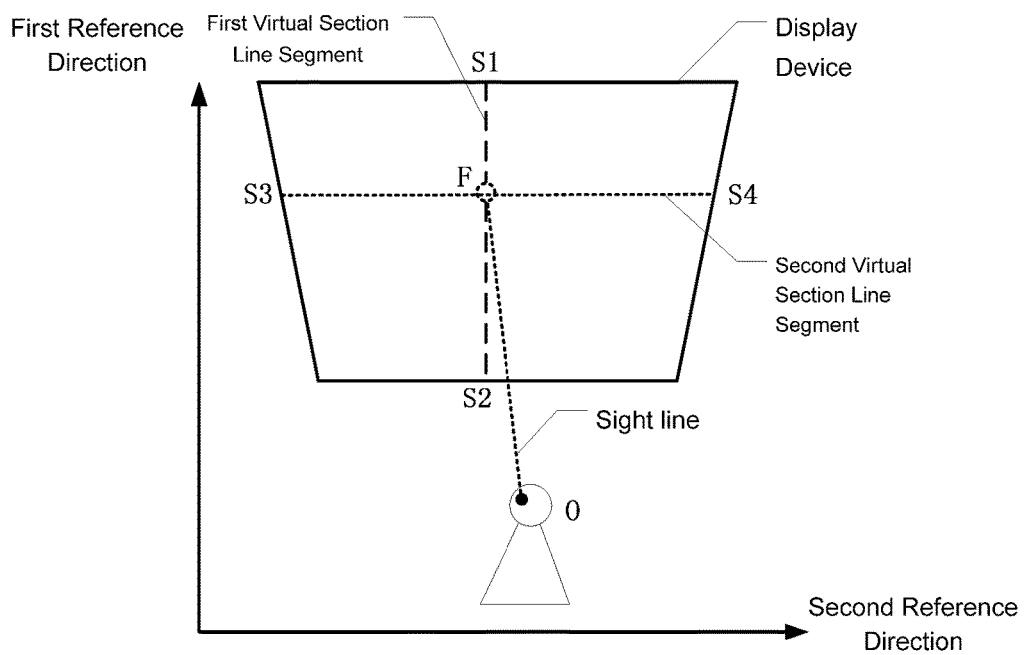
FIG. 5 is a schematic diagram showing the first virtual section line segment S1S2 and a second virtual section line segment S3S4 of a display device, according to embodiments of the disclosure.

Based on the above embodiments, optionally, the image compensating chip is also configured to divide equally the image to be displayed into a plurality of second sub-images along a second reference direction, calculate a compensation ratio along the second reference direction for each second sub-image of the image according to the position information of the view point relative to the display device 31, the angle of sight line and the parameter information of a second virtual section line segment of the display device 31, and compensate each second sub-image of the image along the second reference direction; where the second virtual section line segment has two endpoints located on the frame of the display device 31, is extended along the second reference direction, and passes through an intersection of the sight line and the display device 31. FIG. 5 is a schematic diagram showing the first virtual section line segment and the second virtual section line segment of a display device. As shown in FIG. 5, an intersection F of the sight line OF and the display device is present, the first virtual section line segment S1S2 is parallel to the first reference direction and passes through the intersection F, and the second virtual section line segment S3S4 is parallel to the second reference direction and passes through the intersection F.

Figure 6:
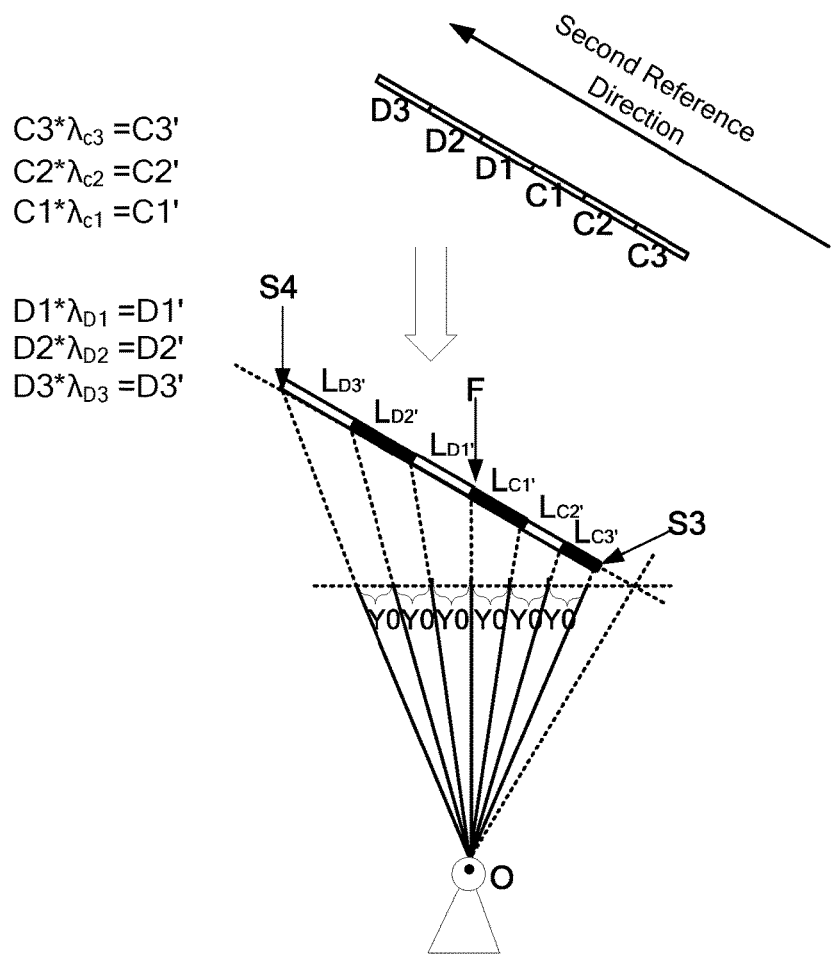
FIG. 6 is a schematic diagram showing a sectional view taken along the second virtual section line segment S3S4 in FIG. 5.

FIG. 6 shows a sectional view taken along the second virtual section line segment S3S4 in FIG. 5. In embodiments of the disclosure, in addition that each first sub-image of the image to be displayed are compensated along the first reference direction, each second sub-image of the image are also compensated along the second reference direction. As for the compensation for each first sub-image of the image to be displayed along the first reference direction, reference can be made to FIG. 4, which will not be described again here. As shown in FIG. 6, illustratively, the image to be displayed is divided equally into six second sub-images C3, C2, C1, D1, D2 and D3 along the second reference direction, and the lengths of the six second sub-images along the second reference direction are identical and are represented by Y0. The compensation ratios along the second reference direction for the second sub-images C3, C2, C1, D1, D2 and D3 are calculated as $\lambda_{C3}$, $\lambda_{C2}$, $\lambda_{C1}$, $\lambda_{D1}$, $\lambda_{D2}$ and $\lambda_{D3}$, respectively, so that compensated second sub-images C3', C2', C1', D1', D2', D3' are obtained through multiplying the lengths of the second sub-images C3, C2, C1, D1, D2, D3 along the second reference direction by the corresponding compensation ratios $\lambda_{C3}$, $\lambda_{C2}$, $\lambda_{C1}$, $\lambda_{D1}$, $\lambda_{D2}$ and $\lambda_{D3}$ along the second reference direction. That is, the lengths $L_{C3'}$, $L_{C2'}$, $L_{C1'}$, $L_{D1'}$, $L_{D2'}$ and $L_{D3'}$ of the compensated second sub-images C3', C2', C1', D1', D2', D3' along the second reference direction are respectively equal to the lengths of the second sub-images C3, C2, C1, D1, D2 and D3 along the second reference direction respectively multiplied by the corresponding compensation ratios $\lambda_{C3}$, $\lambda_{C2}$, $\lambda_{C1}$, $\lambda_{D1}$, $\lambda_{D2}$ and $\lambda_{D3}$ along the second reference direction. Thus, the compensated second sub-images C3', C2', C1', D1', D2', D3 displayed by the display device respectively have actual lengths $L_{C3'}$, $L_{C2'}$, $L_{C1'}$, $L_{D1'}$, $L_{D2'}$ and $L_{D3'}$ along the second reference direction, where $L_{C3'} \neq L_{C2'} \neq L_{C1'} \neq L_{D1'} \neq L_{D2'} \neq L_{D3'}$. However, the compensated second sub-images are viewed at the view point as having the same length along the second reference direction, that is, the eyes of the viewer at the view point perceive that the compensated second sub-images C3', C2', C1', D1', D2' and D3' have the same length Y0 along the second reference direction, thereby avoiding the case that the displayed image is viewed as deformed along the second reference direction when the display device is viewed laterally or is distorted. In embodiments of the disclosure, the problem of deformation of the displayed image in both the first reference direction and the second reference direction is solved.

It should be noted that the image to be displayed is illustratively divided equally into six second sub-images along the second reference direction in FIG. 6, but the embodiments of the disclosure are not limited thereto. In embodiments of the disclosure, the number of second sub-images divided equally from the image to be displayed along the second reference direction is not limited. The higher the number of the second sub-images of the image is, the finer the image as displayed will be, and the better the display effect of a curved display device will be.

Based on the above embodiments, further, the size of each compensated second sub-image of the image along the second reference direction is larger than or equal to the size of one sub-pixel of the display device along the second reference direction. In such configuration, advantageously, each compensated second sub-image of the image can be completely displayed on the display device, thus avoiding the problem that some region cannot be displayed since the compensated second sub-images of the image is smaller than the size of one sub-pixel, because the second sub-images divided equally from the image along the second reference direction are excessive.

Based on the above embodiments, optionally, the detection device includes at least two cameras, by which the position information of the view point relative to the display device and the angle of sight line are obtained.

It should be noted that the type and shape of the display device is not limited in the embodiments of the disclosure, for example, the display device may be a flat display device or a curved surface display device, or may be a flexible display device. Thus, the first virtual section line segment of the display device may be a virtual straight line segment or a virtual curved line segment, and the second virtual section line segment of the display device may also be a virtual straight line segment or a virtual curved line segment.

Based on above embodiments, the image displaying system also includes a storage device configured to store the parameter information of the first virtual section line segment of the display device and/or the parameter information of the first virtual section line segment of the display device, for use in calculating the compensation ratio by the image compensating chip.

Figure 7:
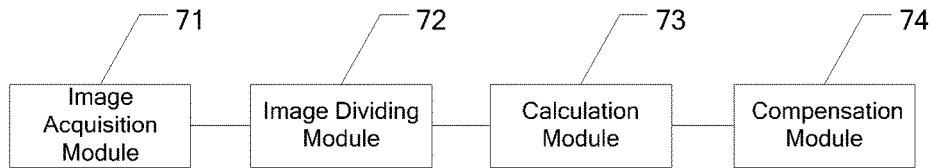
FIG. 7 is a schematic diagram showing an image compensating chip, according to embodiments of the disclosure.

FIG. 7 is a schematic diagram showing an image compensating chip, according to embodiments of the disclosure. As shown in FIG. 7, the image compensating chip includes: an image acquisition module 71, an image dividing module 72, a calculation module 73 and a compensation module 74. The image acquisition module 71 is configured to acquire the image to be displayed. The image dividing module 72 is configured to divide equally the acquired image into a plurality of first sub-images along a first reference direction and/or divide equally the acquired image into a plurality of second sub-images along a second reference direction. The calculation module 73 is configured to calculate a compensation ratio along the first reference direction for each first sub-image of the image according to the position information of the view point relative to the display device, the angle of sight line and the parameter information of a first virtual section line segment of the display device, and/or calculate a compensation ratio along the second reference direction for each second sub-image of the image according to the position information of the view point relative to the display device, the angle of sight line and the parameter information of a second virtual section line segment of the display device. The compensation module 74 is configured to compensate each first sub-image of the image along the first reference direction according to the compensation ratio along the first reference direction for the first sub-image of the image, and/or compensate each second sub-image of the image along the second reference direction according to the compensation ratio along the second reference direction for the second sub-image of the image.

Figure 8:
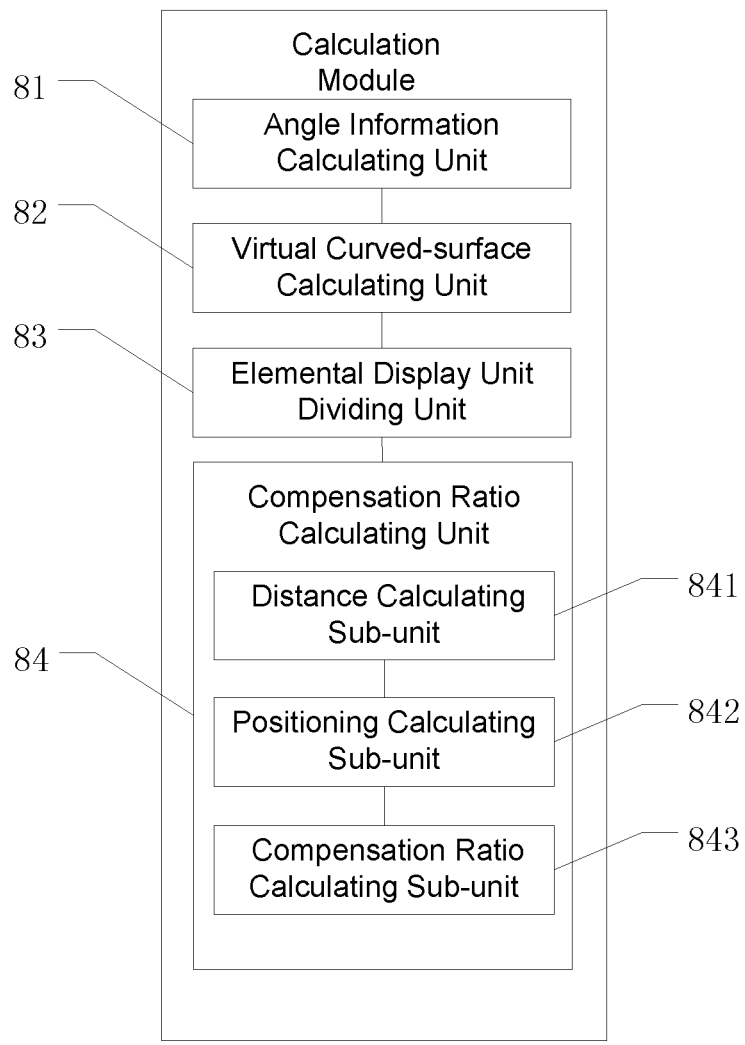
FIG. 8 is a schematic diagram showing a structure of an calculation module in the case that the first virtual section line segment is straight and/or the second virtual section line segment is straight, according to embodiments of the disclosure.

Based on above embodiments, embodiments of the disclosure further provide a calculation module 73, which is configured, in the case of the straight first virtual section line segment and/or the second virtual section line segment of the display device, to calculate a compensation ratio along the first reference direction for each first sub-image of the image according to the position information of the view point relative to the display device, the angle of sight line and the parameter information of a first virtual section line segment of the display device, and/or calculate a compensation ratio along the second reference direction for each second sub-image of the image according to the position information of the view point relative to the display device, the angle of sight line and the parameter information of a second virtual section line segment of the display device. FIG. 8 is a schematic diagram showing a structure of the calculation module in the case that the first virtual section line segment and/or the second virtual section line segment of the display device is straight, according to embodiments of the disclosure. As shown in FIG. 8, the calculation module includes: an angle information calculating unit 81, a virtual curved-surface calculating unit 82, an elemental display unit dividing unit 83, and a compensation ratio calculating unit 84. The angle information calculating unit 81 is configured to calculate an angle between the sight line and the first virtual section line segment, an angle between the first virtual section line segment and a line passing through both the view point and one of the two endpoints of the first virtual section line segment, and an angle between the first virtual section line segment and a line passing through both the view point and the other of the two endpoints of the first virtual section line segment according to the position information of the view point relative to the display device, the angle of sight line and the parameter information of the first virtual section line segment. In addition or alternatively, the angle information calculating unit 81 is configured to calculate an angle between the sight line and the second virtual section line segment, an angle between the second virtual section line segment and a line passing through both the view point and one of the two endpoints of the second virtual section line segment, and an angle between the second virtual section line segment and a line passing through both the view point and the other of the two endpoints of the second virtual section line segment according to the position information of the view point relative to the display device, the angle of sight line and the parameter information of the second virtual section line segment.

The manner for calculating a compensation ratio along the first reference direction for each first sub-image of the image will be described in detail below. It should be noted that the manner for calculating the compensation ratio along the second reference direction for each second sub-image of the image is similar with that for calculating the compensation ratio along the first reference direction for each first sub-image of the image in the case that the second virtual section line segment is straight, which is not repeated.

Referring to FIG. 4, the first virtual section line segment S1S2 is a virtual straight line segment, the angle θ is formed between the sight line OF and the first virtual section line segment S1S2, the angle θ1 is formed between the first virtual section line segment S1S2 and the line OS1 connecting the view point O to the endpoint S1 of the first virtual section line segment S1S2, and the angle θ2 is formed between the first virtual section line segment S1S2 and the line OS2 connecting the view point O to the endpoint S2 of the first virtual section line segment S1S2.

The virtual curved-surface calculating unit 82 is configured to determine a first virtual display plane according to the parameter information of the first virtual section line segment, the angle between the sight line and the first virtual section line segment, the angle between the first virtual section line segment and a line passing through both the view point and one of the two endpoints of the first virtual section line segment, and the angle between the first virtual section line segment and a line passing through both the view point and the other of the two endpoints of the first virtual section line segment. In addition or alternatively, the virtual curved-surface calculating unit 82 is configured to determine a second virtual display plane according to the parameter information of the second virtual section line segment, the angle between the sight line and the second virtual section line segment, the angle between the second virtual section line segment and a line passing through both the view point and one of the two endpoints of the second virtual section line segment, and the angle between the second virtual section line segment and a line passing through both the view point and the other of the second endpoints of the second virtual section line segment.

As shown in FIG. 4, the length of the first virtual section line segment S1S2 is represented as L1, thus, the distance OP from the view point O to the first virtual section line segment S1S2 of the display device can be obtained as $$OP = \frac{L1 \cdot \tan\theta 1}{\frac{\tan\theta 1}{\tan\theta 2} + 1}$$

if θ2≤θ1 illustratively, or $$OP = \frac{L1 \cdot \tan\theta 2}{\frac{\tan\theta 2}{\tan\theta 1} + 1} \text{ if } \theta 2 \geq \theta 1 \frac{L1a?? \tan ??2}{\frac{\tan ??2}{\tan ??1} + 1}.$$

Here, a line passing through the view point O and the point P on the extension line of the first virtual section line segment S1S2 is perpendicular to the first virtual section line segment S1S2. The first virtual display plane M1N1 includes the point P and is perpendicular to the sight line OF.

The elemental display unit dividing unit 83 is configured to divide equally the first virtual display plane into a plurality of first elemental display units along a first direction, and obtain the length of each of the first elemental display units along the first direction, where the plurality of first elemental display units correspond to the plurality of first sub-images, respectively, and the first direction is the extension direction of a projection of the first virtual section line segment onto the first virtual display plane. In addition or alternatively, the elemental display unit dividing unit 83 is configured to divide equally the second virtual display plane into a plurality of second elemental display units along a second direction, and obtain the length of each of the second elemental display units along the second direction, where the plurality of second elemental display units correspond to the plurality of second sub-images, respectively, and the second direction is the extension direction of a projection of the second virtual section line segment onto the second virtual display plane.

The first virtual display plane M1N1 is divided into two parts with respect to the sight line OF, that is, a part of the first virtual display plane M1N1 above the sight line OF and a part of the first virtual display plane M1N1 below the sight line OF. A projection of a line segment FS1 from the endpoint S1 to the intersection F, which is above the sight line OF, onto the first virtual display plane M1N1 is represented as Xup, and a projection of a line segment FS2 from the endpoint S2 to the intersection F, which is below the sight line OF, onto the first virtual display plane M1N1 is represented as Xdown, where, the lengths of the line segment FS1, the line segment FS2, the projection Xup, and the projection Xdown are calculated as follows:

$$FS1 = \frac{L1}{\frac{\tan\theta_1}{\tan\theta_2}+1}(1+\tan\theta_1\cot\theta);$$

$$FS2 = \frac{L1}{\frac{\tan\theta_2}{\tan\theta_1}+1}(1-\tan\theta_2\cot\theta);$$

$$Xup = \frac{L1}{\frac{\tan\theta_1}{\tan\theta_2}+1}\tan\theta_1\cdot\sin\theta\cdot\frac{\sin\theta+\tan\theta_1\cdot\cos\theta}{\tan\theta_1\cdot\sin\theta-\cos\theta};$$

$$Xdown = \frac{L1}{\frac{\tan\theta_2}{\tan\theta_1}+1}\tan\theta_2\cdot\sin\theta\cdot\frac{\sin\theta+\tan\theta_2\cdot\cos\theta}{\tan\theta_2\cdot\sin\theta-\cos\theta}.$$

As such, the first virtual display plane M1N1 is divided equally into a plurality of first elemental display units along the first direction. For example, the part of the first virtual display plane M1N1 above the sight line OF corresponds to the projection Xup and includes m first elemental display units, so that the length of each of the first elemental display units along the first direction is calculated as $$X0 = \frac{Xup}{m} = \frac{1}{m}\cdot\frac{L1}{\frac{\tan\theta_1}{\tan\theta_2}+1}\tan\theta_1\cdot\sin\theta\cdot\frac{\sin\theta+\tan\theta_1\cdot\cos\theta}{\tan\theta_1\cdot\sin\theta-\cos\theta}.$$

Illustratively, the first virtual display plane M1N1 is divided equally into five first elemental display units along the first direction, where the part of the first virtual display plane M1N1 corresponding to the projection Xup includes three first elemental display units, and the part of the first virtual display plane M1N1 corresponding to the projection Xdown includes two first elemental display units. The five first elemental display units, i.e. first elemental display units W2, W1, X1, X2 and X3 disposed sequentially along the first direction, each have a length X0 along the first direction. Moreover, each of the first elemental display units corresponds to one of the first sub-images, so that the first elemental display units W2, W1, X1, X2 and X3 correspond to the first sub-images B2, B1, A1, A2 and A3, respectively.

The compensation ratio calculating unit 84 is configured to calculate the compensation ratio along the first reference direction for each first sub-image of the image to be displayed, according to the parameter information of the first virtual section line segment, the angle between the sight line and the first virtual section line segment, the angle between the first virtual section line segment and a line passing through both the view point and one of the two endpoints of the first virtual section line segment, the angle between the first virtual section line segment and a line passing through both the view point and the other of the two endpoints of the first virtual section line segment, and the length of each of the first elemental display units along the first direction. In addition or alternatively, the compensation ratio calculating unit 84 is configured to calculate the compensation ratio along the second reference direction for each second sub-image of the image to be displayed, according to the parameter information of the second virtual section line segment, the angle between the sight line and the second virtual section line segment, the angle between the second virtual section line segment and a line passing through both the view point and one of the two endpoints of the second virtual section line segment, the angle between the second virtual section line segment and a line passing through both the view point and the other of the two endpoints of the second virtual section line segment, and the length of each of the second elemental display units along the second direction.

In embodiments, the compensation ratio k along the first reference direction for each first sub-image of the image to be displayed is calculated according to the length L1 of the first virtual section line segment S1S2, the angle θ between the sight line and the first virtual section line segment S1S2, the angle θ1 between the first virtual section line segment and a line passing through both the view point and one of the two endpoints of the first virtual section line segment, the angle θ2 between the first virtual section line segment and a line passing through both the view point and the other of the two endpoints of the first virtual section line segment, and the length X0 of each of the first elemental display units along the first direction. Then the length of each first sub-image of the image along the first reference direction is compensated through multiplying the length of the first sub-image of the image along the first reference direction by the corresponding compensation ratio k, so that the compensated first sub-images are viewed at the view point as having the same size along the first reference direction. Illustratively, the first compensated sub-images B2', B1', A1', A2' and A3' are obtained through multiplying the lengths of the first sub-images B2, B1, A1, A2 and A3 by the corresponding compensation ratios k, respectively, and the compensated first sub-images B2', B1', A1', A2' and A3' are viewed at the view point as having the same size X0.

Optionally, the compensation ratio calculating unit 84 includes: a distance calculating sub-unit 841, an positioning calculating sub-unit 842 and a compensation ratio calculating sub-unit 843. The distance calculating sub-unit 841 is configured to calculate the distance from the intersection of the sight line and the display device to the view point and the distance from the view point to the first virtual display plane, according to the parameter information of the first virtual section line segment, the angle between the sight line and the first virtual section line segment, the angle between the first virtual section line segment and a line passing through both the view point and one of the two endpoints of the first virtual section line segment, and the angle between the first virtual section line segment and a line passing through both the view point and the other of the two endpoints of the first virtual section line segment. In addition or alternatively, the distance calculating sub-unit 841 is configured to calculate the distance from the intersection of the sight line and the display device to the view point and the distance from the view point to the second virtual display plane, according to the parameter information of the second virtual section line segment, the angle between the sight line and the second virtual section line segment, the angle between the second virtual section line segment and a line passing through both the view point and one of the two endpoints of the second virtual section line segment, and the angle between the second virtual section line segment and a line passing through both the view point and the other of the two endpoints of the second virtual section line segment.

Referring to FIG. 4, the distance OF from the intersection F of the sight line and the display device to the view point O is calculated as $$OF = C1 = \frac{L1 \cdot \tan\theta_1}{\frac{\tan\theta_1}{\tan\theta_2} + 1} \csc\theta, \ OF = C1 = \frac{L1 \cdot \tan\theta_1}{\frac{\tan\theta_1}{\tan\theta_2} + 1} \csc\theta,$$

and the distance OG from the view point O to the first virtual display plane M1N1 is calculated as $$OG = C3 = \frac{L1}{\frac{\tan\theta_1}{\tan\theta_2} + 1} \cdot \tan\theta_1 \cdot \sin\theta.$$

The positioning calculating sub-unit 842 is configured to determine a positioning sequence number of each first sub-image of the image along the first reference direction according to the parameter information of the first virtual section line segment, the angle between the sight line and the first virtual section line segment, the angle between the first virtual section line segment and a line passing through both the view point and one of the two endpoints of the first virtual section line segment, the angle between the first virtual section line segment and a line passing through both the view point and the other of the two endpoints of the first virtual section line segment, and the length of each of the first elemental display units along the first direction. In addition or alternatively, the positioning calculating sub-unit 842 is configured to determine a positioning sequence number of each second sub-image of the image along the second reference direction according to the parameter information of the second virtual section line segment, the angle between the sight line and the second virtual section line segment, the angle between the second virtual section line segment and a line passing through both the view point and one of the two endpoints of the second virtual section line segment, the angle between the second virtual section line segment and a line passing through both the view point and the other of the two endpoints of the second virtual section line segment, and the length of each of the second elemental display units along the second direction.

As shown in FIG. 4, taking the sight line OF as a reference line and starting from the intersection F of the sight line OF and the first virtual section line segment S1S2, the first sub-images A1, A2 and A3 are arranged and numbered in sequence along the first reference direction, and the first sub-images B1 and B2 are arranged and numbered in sequence along a direction opposite to the first reference direction. It should be noted that, in FIG. 4, five first sub-images are provided illustratively for ease of description, but the embodiments of the disclosure are not limited thereto. Given that the first sub-images of the image to be displayed are arranged along the first reference direction, the sight line is used as a reference line and the intersection F is used as a start point, the first sub-images are arranged and numbered in sequence along the first reference direction and a direction opposite thereto, respectively. For example, if M first sub-images are arranged along the first reference direction starting from the intersection F, and N first sub-images are arranged along a direction opposite to the first reference direction starting from the intersection F, the positioning sequence numbers of the first sub-images along the first reference direction are set as BN, BN−1, BN−2, B2, B1, A1, A2, . . . , AM−1, AM, where M and N are both integers larger than 1.

The compensation ratio calculating sub-unit 843 is configured to calculate the compensation ratio along the first reference direction for each first sub-image of the image to be displayed, according to the positioning sequence number of each first sub-image of the image along the first reference direction, the distance from the intersection of the sight line and the display device to the view point, the distance from the view point to the first virtual display plane, and the length of each of the first elemental display units along the first direction. In addition or alternatively, the compensation ratio calculating sub-unit 843 is configured to calculate the compensation ratio along the second reference direction for each second sub-image of the image to be displayed, according to the positioning sequence number of each second sub-image of the image along the second reference direction, the distance from the intersection of the sight line and the display device to the view point, the distance from the view point to the second virtual display plane, and the length of each of the second elemental display units along the second direction.

Given the positioning sequence number of each first sub-image of the image to be displayed along the first reference direction, the distance from the projection of the view point onto the display device to the view point, the distance from the view point to the first virtual display plane, and the length of each of the first elemental display units along the first direction, the compensation ratio k may be calculated by a specific calculating formula as follows:

$$Kn = \frac{C1 \cdot n \cdot X0}{C3 \cdot \sin\theta + \cos\theta \cdot n \cdot X0} - \frac{C1 \cdot (n-1)}{C3 \cdot \sin\theta + \cos\theta \cdot (n-1) \cdot X0},$$

where n is a positive integer, and n∈[1,N] or n∈[1, M], and $$C1 = \frac{L1 \cdot \tan\theta_1}{\frac{\tan\theta_1}{\tan\theta_2} + 1} \csc\theta, \ C3 = \frac{L1}{\frac{\tan\theta_1}{\tan\theta_2} + 1} \cdot \tan\theta_1 \cdot \sin\theta.$$

Herein, n represents the positioning sequence number of the first sub-image of the image along the first reference direction, for example, the compensation ratio K2 for the first sub-image $B_2$ along the first reference direction is calculated as:

$$K2 = \frac{C1 \cdot 2 \cdot X0}{C3 \cdot \sin\theta + \cos\theta \cdot 2 \cdot X0} - \frac{C1 \cdot (2-1)}{C3 \cdot \sin\theta + \cos\theta \cdot (2-1) \cdot X0}.$$

Figure 9:
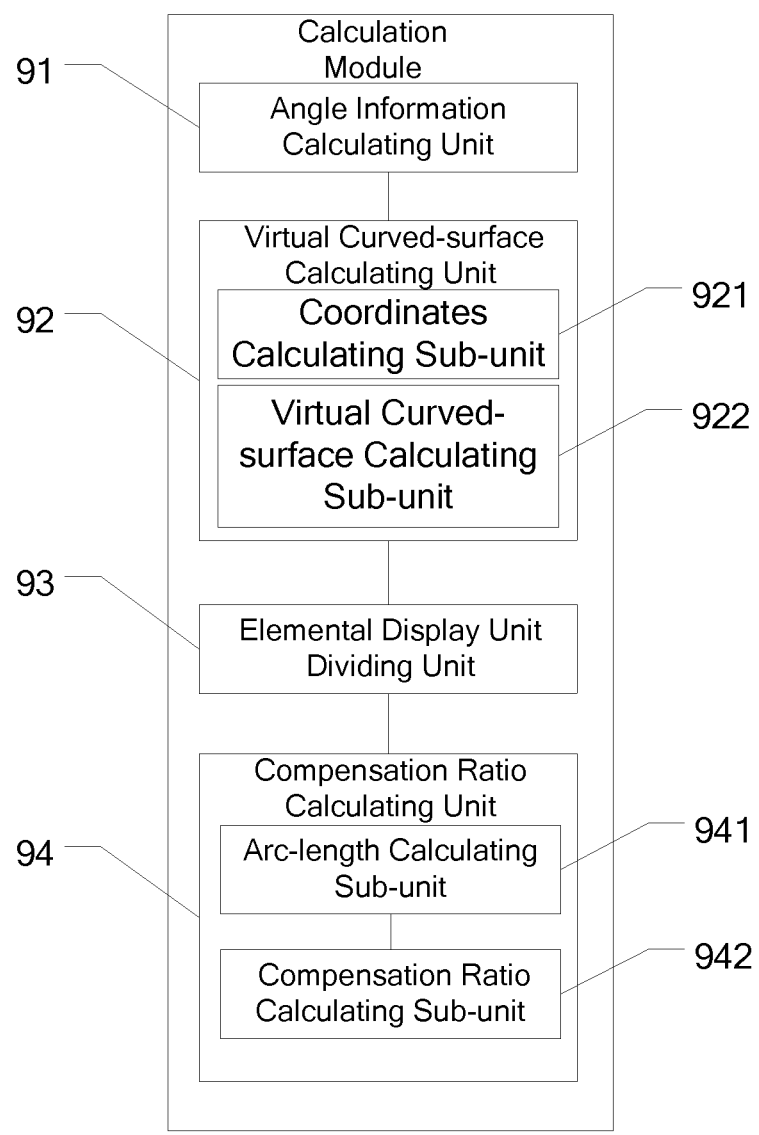
FIG. 9 is a schematic diagram showing the structure of the calculation module in the case that the first virtual section line segment is curved and/or the second virtual section line segment is curved, according to embodiments of the disclosure.

FIG. 9 is a schematic diagram showing a structure of the calculation module in the case that the first virtual section line segment and/or the second virtual section line segment of the display device is curved, according to embodiments of the disclosure. As shown in FIG. 9, the calculation module includes: an angle information calculating unit 91, a virtual curved-surface calculating unit 92, an elemental display unit dividing unit 93, and a compensation ratio calculating unit 94. The angle information calculating unit 91 is configured to calculate an angle between the sight line and a line passing through both the view point and one of the two endpoints of the first virtual section line segment, an angle between the sight line and a line passing through both the view point and the other of the two endpoints of the first virtual section line segment, an angle between the line passing through both the view point and one of the two endpoints of the first virtual section line segment and a tangent line to the first virtual section line segment at the one of the two endpoints of the first virtual section line segment, and an angle between the line passing through both the view point and the other of the two endpoints of the first virtual section line segment and a tangent line to the first virtual section line segment at the other of the two endpoints of the first virtual section line segment, according to the position information of the view point relative to the display device, the angle of sight line and the parameter information of the first virtual section line segment. In addition or alternatively, the angle information calculating unit 91 is configured to calculate an angle between the sight line and a line passing through both the view point and one of the two endpoints of the second virtual section line segment, an angle between the sight line and a line passing through both the view point and the other of the two endpoints of the second virtual section line segment, an angle between the line passing through both the view point and one of the two endpoints of the second virtual section line segment and a tangent line to the second virtual section line segment at the one of the two endpoints of the second virtual section line segment, and an angle between the line passing through both the view point and the other of the two endpoints of the second virtual section line segment and a tangent line to the second virtual section line segment at the other of the two endpoints of the second virtual section line segment, according to the position information of the view point relative to the display device, the angle of sight line and the parameter information of the second virtual section line segment.

Figure 10:
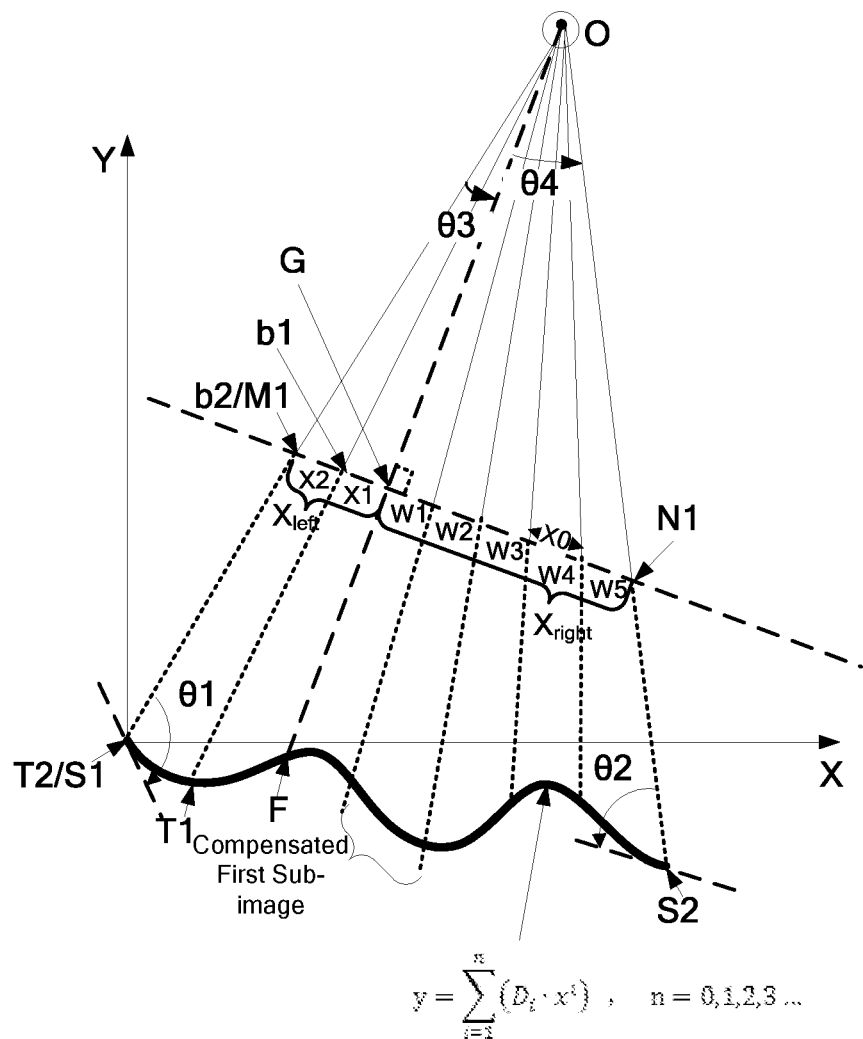
FIG. 10 is a schematic diagram of calculating the compensation ratio along the first reference direction for each first sub-image of an image to be displayed in the case that the first virtual section line segment is curved, according to embodiments of the disclosure.

The manner for calculating a compensation ratio along the first reference direction for each first sub-image of the image will be described in detail below. FIG. 10 is a schematic diagram showing the manner of calculating a compensation ratio along the first reference direction for each first sub-image of the image in the case that the first virtual section line segment is curved. It should be noted that the manner for calculating the compensation ratio along the second reference direction for each second sub-image of the image is similar with that for calculating the compensation ratio along the first reference direction for each first sub-image of the image in the case that the second virtual section line segment is curved, which is not repeated.

As shown in FIG. 10, two endpoints of the first virtual section line segment S1S2 are represented as S1 and S2. The first virtual section line segment S1S2 is curved, and the parameter information of the first virtual section line segment S1S2 is obtained by taking the endpoint S1 as the origin of a coordinate system with two coordinate axes X and Y perpendicular to each other; generally, a curved line may be represented by polynomial fitting through an equation as below:

$$y = \sum_{i=1}^{n} (D_i \cdot x^i), \quad n = 0, 1, 2, 3 \ldots,$$

which equation is herein used for expressing the first virtual section line segment S1S2.

Thus, coordinates of the endpoint S1 are (0,0); an equation of the tangent line to the first virtual section line segment S1S2 at the endpoint S1 is represented by $y=D_1 \cdot x$, where D1 denotes the slope of the tangent line at the endpoint S1; coordinates of the endpoint S2 are $(x_{S2}, y_{S2})$; and an equation of the tangent line to the first virtual section line segment S1S2 at the endpoint S2 is represented by $y-y_{S2}=\Sigma_{i=1}^{n}(i \cdot D_1 \cdot x_{S2}^{i-1})(x \cdot x_{S2})$, where $\Sigma_{i=1}^{n}=1(i \cdot D1 \cdot x_{S2}^{i-1})$ denotes the slope of the tangent line at the endpoint S2, and n is an integer equal to or larger than 0, i.e. n=0, 1, 2, 3, . . . .

An angle θ1 is formed between the line OS1 connecting the view point O to the endpoint S1 of the first virtual section line segment S1S2 and the tangent line $y=D_1 \cdot x$ to the first virtual section line segment S1S2 at the endpoint S1; an angle θ2 is formed between the line OS2 connecting the view point O to the endpoint S2 of the first virtual section line segment S1S2 and the tangent line $y-y_{S2}=\Sigma_{i=1}^{n}(i \cdot D_1 \cdot x_{S2}^{i-1})(x \cdot x_{S2})$, n=0, 1, 2, 3 . . . to the first virtual section line segment S1S2 at the endpoint S2; an angle θ3 is formed between the sight line OF and the line OS1 connecting the view point O to the endpoint S1 of the first virtual section line segment S1S2; and an angle θ4 is formed between the sight line OF and the line OS2 connecting the view point O to the endpoint S2 of the first virtual section line segment S1S2.

The virtual curved-surface calculating unit 92 is configured to determine a first virtual display plane according to the parameter information of the first virtual section line segment, the angle between the sight line and a line passing through both the view point and one of the two endpoints of the first virtual section line segment, the angle between the sight line and a line passing through both the view point and the other of the two endpoints of the first virtual section line segment, the angle between the line passing through both the view point and one of the two endpoints of the first virtual section line segment and the tangent line to the first virtual section line segment at the one of the two endpoints of the first virtual section line segment, and the angle between the line passing through both the view point and the other of the two endpoints of the first virtual section line segment and the tangent line to the first virtual section line segment at the other of the two endpoints of the first virtual section line segment. In addition or alternatively, the virtual curved-surface calculating unit 92 is configured to determine a second virtual display plane according to the parameter information of the second virtual section line segment, the angle between the sight line and a line passing through both the view point and one of the two endpoints of the second virtual section line segment, the angle between the sight line and a line passing through both the view point and the other of the two endpoints of the second virtual section line segment, the angle between the line passing through both the view point and one of the two endpoints of the second virtual section line segment and the tangent line to the second virtual section line segment at the one of the two endpoints of the second virtual section line segment, and the angle between the line passing through both the view point and the other of the two endpoints of the second virtual section line segment and the tangent line to the second virtual section line segment at the other of the two endpoints of the second virtual section line segment.

Therefore, the position of the first virtual display plane M1N1 is calculated, according to the above curved line equation of the first virtual section line segment obtained, the angle θ3 between the sight line and a line passing through both the view point and one of the two endpoints of the first virtual section line segment, the angle θ4 between the sight line and a line passing through both the view point and the other of the two endpoints of the first virtual section line segment, the angle θ1 between the line passing through both the view point and one of the two endpoints of the first virtual section line segment and the tangent line to the first virtual section line segment at the one of the two endpoints of the first virtual section line segment, the angle θ2 between the line passing through both the view point and the other of the two endpoints of the first virtual section line segment and the tangent line to the first virtual section line segment at the other of the two endpoints of the first virtual section line segment, where, the first virtual display plane M1N1 is perpendicular to the sight line OF.

Optionally, the virtual curved-surface calculating unit 92 includes, in the case that the first virtual section line segment and/or the second virtual section line segment of the display device is curved: a coordinates calculating sub-unit 921 and a virtual curved-surface calculating sub-unit 922.

The coordinates calculating sub-unit 921 is configured to determine the coordinates of the view point, the coordinates of the intersection of the sight line and the display device, and the coordinates of an intersection of the sight line and the first virtual display plane, according to the parameter information of the first virtual section line segment, the angle between the sight line and a line passing through both the view point and one of the two endpoints of the first virtual section line segment, the angle between the sight line and a line passing through both the view point and the other of the two endpoints of the first virtual section line segment, the angle between the line passing through both the view point and one of the two endpoints of the first virtual section line segment and the tangent line to the first virtual section line segment at the one of the two endpoints, and the angle between the line passing through both the view point and the other of the two endpoints of the first virtual section line segment and the tangent line to the first virtual section line segment at the other of the two endpoints. In addition or alternatively, the coordinates calculating sub-unit 921 is configured to determine the coordinates of the view point, the coordinates of the intersection of the sight line and the display device, and the coordinates of an intersection of the sight line and the second virtual display plane, according to the parameter information of the second virtual section line segment, the angle between the sight line and a line passing through both the view point and one of the two endpoints of the second virtual section line segment, the angle between the sight line and a line passing through both the view point and the other of the two endpoints of the second virtual section line segment, the angle between the line passing through both the view point and one of the two endpoints of the second virtual section line segment and the tangent line to the second virtual section line segment at the one of the two endpoints, and the angle between the line passing through both the view point and the other of the two endpoints of the second virtual section line segment and the tangent line to the second virtual section line segment at the other of the two endpoints.

The virtual curved-surface calculating sub-unit 922 is configured to determine the first virtual display plane according to the coordinates of the view point, the coordinates of the intersection of the sight line and the display device, and the coordinates of an intersection of the sight line and the first virtual display plane. In addition and alternatively, the virtual curved-surface calculating sub-unit 922 is configured to determine the second virtual display plane according to the coordinates of the view point, the coordinates of the intersection of the sight line and the display device, and the coordinates of an intersection of the sight line and the second virtual display plane.

The inclined angle of the tangent line to the first virtual section line segment S1S2 at the endpoint S1 is obtained as arctan D1.

The inclined angle of the tangent line to the first virtual section line segment S1S2 at the endpoint S2 is obtained as $$\arctan\left[\sum_{i=1}^{n}(i \cdot D_i \cdot x_{S2}^{i-1})\right], n=1,2,3,\ldots$$

The inclined angle of the line OS1 is obtained as θ1+arctan D1−π.

The inclined angle of the line OS2 is obtained as $$\arctan\left[\sum_{i=1}^{n}(i \cdot D_i \cdot x_{S2}^{i-1})\right]-\theta2, n=1,2,3,\ldots$$

The equation of the line OS1 is obtained as $$y-x=\tan(\theta1+\arctan D1)\cdot x.$$

The equation of the line OS2 is obtained as $$y-y_{S2}=\tan\left\{\arctan\left[\sum_{i=1}^{n}(i \cdot D_i \cdot x_{S2}^{i-1})\right]-\theta2\right\}\cdot(x-x_{S2}),$$
$$n=1,2,3,\ldots$$

The coordinates $(x_O, y_O)$ of the view point O can be calculated by the above parameters as:

$$\left[\frac{y_{S2}-\tan\left\{\arctan\left[\sum_{i=1}^{n}(i \cdot D_i \cdot x_{S2}^{i-1})\right]-\theta2\right\}\cdot x_{S2}}{\tan(\theta1+\arctan D1)-\tan\{\arctan[\sum_{i=1}^{n}(i \cdot D_i \cdot x_{S2}^{i-1})]-\theta2\}},\right.$$

$$\tan(\theta1+\arctan D1)\cdot$$

$$\left.\frac{y_{S2}-\tan\left\{\arctan\left[\sum_{i=1}^{n}(i \cdot D_i \cdot x_{S2}^{i-1})\right]-\theta2\right\}\cdot x_{S2}}{\tan(\theta1+\arctan D1)-\tan\{\arctan[\sum_{i=1}^{n}(i \cdot D_i \cdot x_{S2}^{i-1})]-\theta2\}}\right].$$

The inclined angle of the sight line OF is obtained as

θ1+θ3+arctan D1−π.

The equation of the sight line OF is obtained as $$y-y_O=\tan(\theta1+\theta3+\arctan D1-\pi)\cdot(x-x_O).$$

The coordinates $(x_F, y_F)$ of the intersection F of the sight line OF and the display device is deducted from the equation below:

$$\begin{cases} y-y_O=\tan(\theta1+\theta3+\arctan D1-\pi)\cdot(x-x_O) \\ y=\sum_{i=1}^{n}(D_i\cdot x^i), \quad n=0,1,2,3\ldots \end{cases}$$

The coordinates of the intersection G of the sight line OF and the first virtual display plane M1N1 are obtained as $$(x_G, y_G)=(x_O-a\cdot(x_O-x_F), y_O-a(y_O-y_F)),$$

$$\text{where, } a=\frac{OG}{OF},$$

such as a=0.5.

Thus, according to the parameters obtained in the above steps, the equation of the first virtual display plane is obtained as:

$$y-y_G=-\cot(\theta1+\theta3+\arctan D1)\cdot(x-x_G).$$

The elemental display unit dividing unit 93 is configured to divide equally the first virtual display plane into a plurality of first elemental display units along a first direction, and obtain position information of each of the first elemental display units along the first direction, where the plurality of first elemental display units correspond to the plurality of first sub-images, respectively, and the first direction is the extension direction of a projection of the first virtual section line segment onto the first virtual display plane. In addition or alternatively, the elemental display unit dividing unit 93 is configured to divide equally the second virtual display plane into a plurality of second elemental display units along a second direction, and obtain position information of each of the second elemental display units along the second direction, where the plurality of second elemental display units correspond to the plurality of second sub-images, respectively, and the second direction is the extension direction of a projection of the second virtual section line segment onto the second virtual display plane.

Referring to FIG. 10, the first virtual display plane M1N1 is divided equally into a plurality of first elemental display units along the first direction. The first direction is the extension direction of the projection of the first virtual section line segment S1S2 onto the first virtual display plane M1N1. The first virtual display plane M1N1 is divided into two parts with respect to the sight line OF, that is, a part of the first virtual display plane M1N1 on the left of the sight line OF and a part of the first virtual display plane M1N1 on the right of the sight line OF. A projection of a virtual curved line segment FS1 from the endpoint S1 to the intersection F, which is a part of the first virtual section line segment S1S2 and on the left of the sight line OF, onto the first virtual display plane M1N1 is represented as $X_{left}$, and a projection of a virtual curved line segment FS2 from the endpoint S2 to the intersection F, which is a part of the first virtual section line segment S1S2 and on the right of the sight line OF, onto the first virtual display plane M1N1 is represented as $X_{right}$. Illustratively, the first virtual display plane M1N1 is divided equally into seven first elemental display units along the first direction, and the length of each of the first elemental display units along the first direction is represented as X0. The part of the first virtual display plane M1N1 corresponding to the projection $X_{left}$ includes two first elemental display units X2 and X1, and the part of the first virtual display plane M1N1 corresponding to the projection $X_{right}$ includes five first elemental display units W1, W2, W3, W4 and W5, thus, the first elemental display units X2, X1, W1, W2, W3, W4 and W5 are arranged in sequence along the first direction, and the seven first elemental display units correspond to the plurality of first sub-images, respectively. For example, the projection $X_{left}$ of the virtual curved line segment FS1 onto the first virtual display plane M1N1 corresponds to first elemental display units X1 and X2 each having a length X0 along the first direction, so that the coordinates of the endpoints of each of first elemental display units along the first direction can be calculated. As shown in FIG. 10, the coordinates of the edge point b1 of the first elemental display unit X1 away from the sight line OF in the first direction and the coordinates of the edge point b2 (which overlaps a point M1 at the edge of the first virtual display plane M1N1) of the first elemental display unit X2 away from the sight line OF in the first direction are calculated as:

$(x_{b1}, y_{b1}) = (x_G + x_{b0}, y_G + y_{b0})$, and $(x_{b2}, y_{b2}) = (x_G + 2x_{b0}, y_G + 2y_{b0})$.

If the part of the first virtual display plane M1N1 corresponding to the projection $X_{left}$ contains m first elemental display units, the coordinates of the edge point bm of the first elemental display unit Xm away from the sight line OF in the first direction may be calculated as $(x_{bm}, y_{bm}) = (x_G + mx_{b0}, y_G + my_{b0})$, where, $\begin{cases} x_{b0} = X0\sin(\theta 1 + \theta 3 + \arctan D1) \\ y_{b0} = X0\cos(\theta 1 + \theta 3 + \arctan D1) \end{cases}$.

The compensation ratio calculating unit 94 is configured to calculate the compensation ratio along the first reference direction for each first sub-image of the image to be displayed, according to the parameter information of the first virtual section line segment, the angle between the sight line and a line passing through both the view point and one of the two endpoints of the first virtual section line segment, the angle between the sight line and a line passing through both the view point and the other of the two endpoints of the first virtual section line segment, the angle between the line passing through both the view point and one of the two endpoints of the first virtual section line segment and the tangent line to the first virtual section line segment at the one of the two endpoints, the angle between the line passing through both the view point and the other of the two endpoints of the first virtual section line segment and the tangent line to the first virtual section line segment at the other of the two endpoints, and the position information of each of the first elemental display units along the first direction. In addition or alternatively, the compensation ratio calculating unit 94 is configured to calculate the compensation ratio along the second reference direction for each second sub-image of the image to be displayed, according to the parameter information of the second virtual section line segment, the angle between the sight line and a line passing through both the view point and one of the two endpoints of the second virtual section line segment, the angle between the sight line and a line passing through both the view point and the other of the two endpoints of the second virtual section line segment, the angle between the line passing through both the view point and one of the two endpoints of the second virtual section line segment and the tangent line to the second virtual section line segment at the one of the two endpoints, the angle between the line passing through both the view point and the other of the two endpoints of the second virtual section line segment and the tangent line to the second virtual section line segment at the other of the two endpoints, and the position information of each of the second elemental display units along the second direction.

As such, the compensation ratio k along the first reference direction for each first sub-image of the image to be displayed may be calculated according to the above equation of the first virtual section line segment $y = \sum_{i=1}^{n}(D_i \cdot x^i)$, n=0,1, 2, 3 . . . , the angle $\theta 3$ between the sight line and a line passing through both the view point and one of the two endpoints of the first virtual section line segment, the angle $\theta 4$ between the sight line and a line passing through both the view point and the other of the two endpoints of the first virtual section line segment, the angle $\theta 1$ between the line passing through both the view point and one of the two endpoints of the first virtual section line segment and the tangent line to the first virtual section line segment at the one of the two endpoints, the angle $\theta 2$ between the line passing through both the view point and the other of the two endpoints of the first virtual section line segment and the tangent line to the first virtual section line segment at the other of the two endpoints, and the position information of each of the first elemental display units along the first direction (that is, the coordinates of the endpoints of each of the first elemental display units along the first direction), and used to adjust the length of each first sub-image along the first reference direction, so that the compensated first sub-images are viewed at the view point as having the same size along the first reference direction. The compensated first sub-image is obtained by multiplying the length of the first sub-image by the corresponding compensation ratio k. Since the compensated first sub-images are viewed at the view point as having the same size X0 along the first reference direction, the problem of image deformation caused by a distorted display device can be solved.

Optionally, the compensation ratio calculating unit 94 includes, in the case that the first virtual section line segment and/or the second virtual section line segment of the display device is curved: an arc-length calculating sub-unit 941 and a compensation ratio calculating sub-unit 942.

The arc-length calculating sub-unit 941 is configured to calculate an arc length of a projection of each of first elemental display units onto the display device along the first reference direction, according to the parameter information of the first virtual section line segment, the angle between the sight line and a line passing through both the view point and one of the two endpoints of the first virtual section line segment, the angle between the sight line and a line passing through both the view point and the other of the two endpoints of the first virtual section line segment, the angle between the line passing through both the view point and one of the two endpoints of the first virtual section line segment and the tangent line to the first virtual section line segment at the one of the two endpoints, the angle between the line passing through both the view point and the other of the two endpoints of the first virtual section line segment and the tangent line to the first virtual section line segment at the other of the two endpoints, and the position information of each of the first elemental display units along the first direction. In addition or alternatively, the arc-length calculating sub-unit 941 is configured to calculate an arc length of a projection of each of second elemental display units onto the display device along the second reference direction, according to the parameter information of the second virtual section line segment, the angle between the sight line and a line passing through both the view point and one of the two endpoints of the second virtual section line segment, the angle between the sight line and a line passing through both the view point and the other of the two endpoints of the second virtual section line segment, the angle between the line passing through both the view point and one of the two endpoints of the second virtual section line segment and the tangent line to the second virtual section line segment at the one of the two endpoints, the angle between the line passing through both the view point and the other of the two endpoints of the second virtual section line segment and the tangent line to the second virtual section line segment at the other of the two endpoints, and the position information of each of the second elemental display units along the second direction.

According to the coordinates of the edge points b1 and b2 of the first elemental display units X1 and X2 away from the sight line in the first direction, which are calculated as $(x_{B1}, y_{B1}) = (x_G + x_{B0}, y_G + y_{B0})$ and $(x_{B2}, y_{B2}) = (x_G + 2x_{B0}, y_G + 2y_{B0})$ as above, and the coordinates $(x_O, y_O)$ of the view point $$\left[ \frac{y_{S2} - \tan\{\arctan[\sum_{i=1}^{n}(i \cdot D_i \cdot x_{S2}^{i-1})] - \theta 2\} \cdot x_{S2}}{\tan(\theta 1 + \arctan D1) - \tan\{\arctan[\sum_{i=1}^{n}(i \cdot D_i \cdot x_{S2}^{i-1})] - \theta 2\}}, \right.$$

$$\tan(\theta 1 + \arctan D1) \cdot$$

$$\left. \frac{y_{S2} - \tan\{\arctan[\sum_{i=1}^{n}(i \cdot D_i \cdot x_{S2}^{i-1})] - \theta 2\} \cdot x_{S2}}{\tan(\theta 1 + \arctan D1) - \tan\{\arctan[\sum_{i=1}^{n}(i \cdot D_i \cdot x_{S2}^{i-1})] - \theta 2\}} \right],$$

an equation of a partitioning line ob1 passing through both the view point O and the edge point b1 and an equation of a partitioning line ob2 passing through both the view point O and the edge point b2 may be respectively calculated as:

$$ob1: \frac{y - y_O}{y_{b1} - y_O} = \frac{x - x_O}{x_{b1} - x_O}$$

$$ob2: \frac{y - y_O}{y_{b2} - y_O} = \frac{x - x_O}{x_{b2} - x_O}.$$

An intersection of the partitioning line ob1 and the first virtual section line segment S1S2 is represented by T1, and an intersection of the partitioning line ob2 and the first virtual section line segment S1S2 is represented by T2 (that is, the endpoint S1).

The coordinates of the intersections T1 and T2 may be obtained by the equations below:

$$T1: \begin{cases} \frac{y - y_O}{y_{b1} - y_O} = \frac{x - x_O}{x_{b1} - x_O} \\ y = \sum_{i=1}^{n}(D_i \cdot x^i), \quad n = 0, 1, 2, 3, \ldots \end{cases},$$

$$T2: \begin{cases} \frac{y - y_O}{y_{b2} - y_O} = \frac{x - x_O}{x_{b2} - x_O} \\ y = \sum_{i=1}^{n}(D_i \cdot x^i), \quad n = 0, 1, 2, 3, \ldots \end{cases}.$$

Given the coordinates of intersections T1 and T2, The arc lengths FT1 and T1T2 of the projections of the first elemental display units X1 and X2 onto the display device along the first reference direction may be obtained as:

$$\text{arc length } FT1 = \int_{N_{T1}}^{xF} \sqrt{1 + [\sum_{i=1}^{n}(i \cdot D_i \cdot x^{i-1})]^2} \, dx, n = 0, 1, 2, 3, \ldots$$

$$\text{arc length } T1T2 = \int_{N_{T2}}^{N_{T1}} \sqrt{1 + [\sum_{i=1}^{n}(i \cdot D_i \cdot x^{i-1})]^2} \, dx, n = 0, 1, 2, 3, \ldots$$

The compensation ratio calculating sub-unit 942 is configured to calculate the compensation ratio along the first reference direction for each first sub-image of the image to be displayed, according to the arc length of the projection of each first elemental display unit onto the display device along the first reference direction. In addition or alternatively, the compensation ratio calculating sub-unit 942 is configured to calculate the compensation ratio along the second reference direction for each second sub-image of the image to be displayed, according to the arc length of the projection of each second elemental display unit onto the display device along the second reference direction.

For example, if the compensation ratios of the two first sub-images of the image to be displayed along the first reference direction are k1 and k2, then $$k1:k2 = \text{arc length } FT1 : \text{arc length } T1T2.$$

It should be noted that the above descriptions only show some embodiments of the disclosure and the technical principles applied. It will be understood that the disclosure is not limited to the specific embodiments described herein, and various apparent variations, readjustments and substitutions may be made without departing from the protection scope of the disclosure. Therefore, although illustrations have been made in the disclosure by the above embodiments, the disclosure is not limited to the above embodiments, and more other embodiments may also be included without departing from the scope of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

I claim:

1. An image displaying system, comprising:
a display device, a detection device located on a frame of the display device, and an image compensating chip located on a driver panel of the display device; wherein
the detection device is configured to obtain position information of a view point relative to the display device, and an angle of sight line;
the image compensating chip is configured to divide equally the image to be displayed into a plurality of first sub-images along a first reference direction, calculate a compensation ratio along the first reference direction for each first sub-image of the image according to the position information of the view point relative to the display device, the angle of sight line and parameter information of a first virtual section line segment of the display device, and compensate each first sub-image of the image along the first reference direction; wherein the first virtual section line segment has two endpoints located on the frame of the display device, is extended along the first reference direction, and passes through an intersection of the sight line and the display device;
the display device is configured to display the compensated image, so that the compensated first sub-images are viewed at the view point as having the same size along the first reference direction.

2. The system according to claim 1, wherein, the size of each compensated first sub-image of the image along the first reference direction is larger than or equal to the size of one sub-pixel of the display device along the first reference direction.

3. The system according to claim 2, further comprising:
the image compensating chip is further configured to divide equally the image to be displayed into a plurality of second sub-images along a second reference direction, calculate a compensation ratio along the second reference direction for each second sub-image of the image according to the position information of the view point relative to the display device, the angle of sight line and the parameter information of a second virtual section line segment of the display device, and compensate each second sub-image of the image along the second reference direction; wherein the second virtual section line segment has two endpoints located on the frame of the display device, is extended along the second reference direction, and passes through an intersection of the sight line and the display device.

4. The system according to claim 3, wherein, the size of each compensated second sub-image of the image along the second reference direction is larger than or equal to the size of one sub-pixel of the display device along the second reference direction.

5. The system according to claim 1, wherein, the detection device comprises at least two cameras.

6. The system according to claim 1, wherein, the image compensating chip comprises: an image acquisition module, an image dividing module, a calculation module and a compensation module, wherein
the image acquisition module is configured to acquire the image to be displayed;
the image dividing module is configured to divide equally the acquired image into a plurality of first sub-images along a first reference direction, and divide equally the acquired image into a plurality of second sub-images along a second reference direction;
the calculation module is configured to calculate a compensation ratio along the first reference direction for each first sub-image of the image according to the position information of the view point relative to the display device, the angle of sight line and the parameter information of a first virtual section line segment of the display device, and calculate a compensation ratio along the second reference direction for each second sub-image of the image according to the position information of the view point relative to the display device, the angle of sight line and the parameter information of a second virtual section line segment of the display device; and
the compensation module is configured to compensate each first sub-image of the image along the first reference direction according to the compensation ratio along the first reference direction for the first sub-image of the image, and compensate each second sub-image of the image along the second reference direction according to the compensation ratio along the second reference direction for the second sub-image of the image.

7. The system according to claim 6, wherein,
the first virtual section line segment of the display device is a virtual straight line segment or a virtual curved line segment, and the second virtual section line segment of the display device is a virtual straight line segment or a virtual curved line segment.

8. The system according to claim 6, wherein,
the calculation module comprises: an angle information calculating unit, a virtual curved-surface calculating unit, an elemental display unit dividing unit, and a compensation ratio calculating unit, wherein in the case that the first virtual section line segment of the display device is a virtual straight line segment, and the second virtual section line segment of the display device is a virtual straight line segment,
the angle information calculating unit is configured to execute at least one of the following steps:
calculating an angle between the sight line and the first virtual section line segment, an angle between the first virtual section line segment and a line passing through both the view point and one of the two endpoints of the first virtual section line segment, and an angle between the first virtual section line segment and a line passing through both the view point and the other of the two endpoints of the first virtual section line segment according to the position information of the view point relative to the display device, the angle of sight line and the parameter information of the first virtual section line segment; and, calculating an angle between the sight line and the second virtual section line segment, an angle between the second virtual section line segment and a line passing through both the view point and one of the two endpoints of the second virtual section line segment, and an angle between the second virtual section line segment and a line passing through both the view point and the other of the two endpoints of the second virtual section line segment according to the position information of the view point relative to the display device, the angle of sight line and the parameter information of the second virtual section line segment;

the virtual curved-surface calculating unit is configured to execute at least one of the following steps:

determining a first virtual display plane according to the parameter information of the first virtual section line segment, the angle between the sight line and the first virtual section line segment, the angle between the first virtual section line segment and a line passing through both the view point and one of the two endpoints of the first virtual section line segment, and the angle between the first virtual section line segment and a line passing through both the view point and the other of the two endpoints of the first virtual section line segment; and, determining a second virtual display plane according to the parameter information of the second virtual section line segment, the angle between the sight line and the second virtual section line segment, the angle between the second virtual section line segment and a line passing through both the view point and one of the two endpoints of the second virtual section line segment, and the angle between the second virtual section line segment and a line passing through both the view point and the other of the second endpoints of the second virtual section line segment;

the elemental display unit dividing unit is configured to execute at least one of the following steps:

dividing equally the first virtual display plane into a plurality of first elemental display units along a first direction, and obtain the length of each of the first elemental display units along the first direction, where the plurality of first elemental display units correspond to the plurality of first sub-images, respectively, and the first direction is the extension direction of a projection of the first virtual section line segment onto the first virtual display plane; and, dividing equally the second virtual display plane into a plurality of second elemental display units along a second direction, and obtain the length of each of the second elemental display units along the second direction, where the plurality of second elemental display units correspond to the plurality of second sub-images, respectively, and the second direction is the extension direction of a projection of the second virtual section line segment onto the second virtual display plane; and the compensation ratio calculating unit is configured to execute at least one of the following steps:

calculating the compensation ratio along the first reference direction for each first sub-image of the image to be displayed, according to the parameter information of the first virtual section line segment, the angle between the sight line and the first virtual section line segment, the angle between the first virtual section line segment and a line passing through both the view point and one of the two endpoints of the first virtual section line segment, the angle between the first virtual section line segment and a line passing through both the view point and the other of the two endpoints of the first virtual section line segment, and the length of each of the first elemental display units along the first direction; and, calculating the compensation ratio along the second reference direction for each second sub-image of the image to be displayed, according to the parameter information of the second virtual section line segment, the angle between the sight line and the second virtual section line segment, the angle between the second virtual section line segment and a line passing through both the view point and one of the two endpoints of the second virtual section line segment, the angle between the second virtual section line segment and a line passing through both the view point and the other of the two endpoints of the second virtual section line segment, and the length of each of the second elemental display units along the second direction.

9. The system according to claim 8, wherein, the compensation ratio calculating unit comprises: a distance calculating sub-unit, an positioning calculating sub-unit and a compensation ratio calculating sub-unit, wherein the distance calculating sub-unit is configured to calculate the distance from the intersection of the sight line and the display device to the view point and the distance from the view point to the first virtual display plane, according to the parameter information of the first virtual section line segment, the angle between the sight line and the first virtual section line segment, the angle between the first virtual section line segment and a line passing through both the view point and one of the two endpoints of the first virtual section line segment, and the angle between the first virtual section line segment and a line passing through both the view point and the other of the two endpoints of the first virtual section line segment; and, the distance calculating sub-unit is configured to calculate the distance from the intersection of the sight line and the display device to the view point and the distance from the view point to the second virtual display plane, according to the parameter information of the second virtual section line segment, the angle between the sight line and the second virtual section line segment, the angle between the second virtual section line segment and a line passing through both the view point and one of the two endpoints of the second virtual section line segment, and the angle between the second virtual section line segment and a line passing through both the view point and the other of the two endpoints of the second virtual section line segment;

the positioning calculating sub-unit is configured to execute at least one of the following steps:

determining a positioning sequence number of each first sub-image of the image along the first reference direction according to the parameter information of the first virtual section line segment, the angle between the sight line and the first virtual section line segment, the angle between the first virtual section line segment and a line passing through both the view point and one of the two endpoints of the first virtual section line segment, the angle between the first virtual section line segment and a line passing through both the view point and the other of the two endpoints of the first virtual section line segment, and the length of each of the first elemental display units along the first direction; and, determining a positioning sequence number of each second sub-image of the image along the second reference direction according to the parameter information of the second virtual section line segment, the angle between the sight line and the second virtual section line segment, the angle between the second virtual section line segment and a line passing through both the view point and one of the two endpoints of the second virtual section line segment, the angle between the second virtual section line segment and a line passing through both the view point and the other of the two endpoints of the second virtual section line segment, and the length of each of the second elemental display units along the second direction; and the compensation ratio calculating sub-unit is configured to execute at least one of the following steps:

calculating the compensation ratio along the first reference direction for each first sub-image of the image to be displayed, according to the positioning sequence number of each first sub-image of the image along the first reference direction, the distance from the intersection of the sight line and the display device to the view point, the distance from the view point to the first virtual display plane, and the length of each of the first elemental display units along the first direction; and, calculating the compensation ratio along the first reference direction for each first sub-image of the image to be displayed, according to the positioning sequence number of each second sub-image of the image along the second reference direction, the distance from the intersection of the sight line and the display device to the view point, the distance from the view point to the second virtual display plane, and the length of each of the second elemental display units along the second direction.

10. The system according to claim 6, wherein, the calculation module comprises: an angle information calculating unit, a virtual curved-surface calculating unit, an elemental display unit dividing unit, and a compensation ratio calculating unit, wherein in the case that the first virtual section line segment of the display device is a virtual curved line segment, and the second virtual section line segment of the display device is a virtual curved line segment, the angle information calculating unit is configured to execute at least one of the following steps:

calculating an angle between the sight line and a line passing through both the view point and one of the two endpoints of the first virtual section line segment, an angle between the sight line and a line passing through both the view point and the other of the two endpoints of the first virtual section line segment, an angle between the line passing through both the view point and one of the two endpoints of the first virtual section line segment and a tangent line to the first virtual section line segment at the one of the two endpoints of the first virtual section line segment, and an angle between the line passing through both the view point and the other of the two endpoints of the first virtual section line segment and a tangent line to the first virtual section line segment at the other of the two endpoints of the first virtual section line segment, according to the position information of the view point relative to the display device, the angle of sight line and the parameter information of the first virtual section line segment; and, calculating an angle between the sight line and a line passing through both the view point and one of the two endpoints of the second virtual section line segment, an angle between the sight line and a line passing through both the view point and the other of the two endpoints of the second virtual section line segment, an angle between the line passing through both the view point and one of the two endpoints of the second virtual section line segment and a tangent line to the second virtual section line segment at the one of the two endpoints of the second virtual section line segment, and an angle between the line passing through both the view point and the other of the two endpoints of the second virtual section line segment and a tangent line to the second virtual section line segment at the other of the two endpoints of the second virtual section line segment, according to the position information of the view point relative to the display device, the angle of sight line and the parameter information of the second virtual section line segment;

the virtual curved-surface calculating unit is configured to determine a first virtual display plane according to the parameter information of the first virtual section line segment, the angle between the sight line and a line passing through both the view point and one of the two endpoints of the first virtual section line segment, the angle between the sight line and a line passing through both the view point and the other of the two endpoints of the first virtual section line segment, the angle between the line passing through both the view point and one of the two endpoints of the first virtual section line segment and the tangent line to the first virtual section line segment at the one of the two endpoints of the first virtual section line segment, and the angle between the line passing through both the view point and the other of the two endpoints of the first virtual section line segment and the tangent line to the first virtual section line segment at the other of the two endpoints of the first virtual section line segment; and, the virtual curved-surface calculating unit is configured to determine a second virtual display plane according to the parameter information of the second virtual section line segment, the angle between the sight line and a line passing through both the view point and one of the two endpoints of the second virtual section line segment, the angle between the sight line and a line passing through both the view point and the other of the two endpoints of the second virtual section line segment, the angle between the line passing through both the view point and one of the two endpoints of the second virtual section line segment and the tangent line to the second virtual section line segment at the one of the two endpoints of the second virtual section line segment, and the angle between the line passing through both the view point and the other of the two endpoints of the second virtual section line segment and the tangent line to the second virtual section line segment at the other of the two endpoints of the second virtual section line segment;

the elemental display unit dividing unit is configured to execute at least one of the following steps:

dividing equally the first virtual display plane into a plurality of first elemental display units along a first direction, and obtain position information of each of the first elemental display units along the first direction, wherein the plurality of first elemental display units correspond to the plurality of first sub-images, respectively, and the first direction is the extension direction of a projection of the first virtual section line segment onto the first virtual display plane; and, dividing equally the second virtual display plane into a plurality of second elemental display units along a second direction, and obtain position information of each of the second elemental display units along the second direction, wherein the plurality of first elemental display units correspond to the plurality of first sub-images, respectively, and the second direction is the extension direction of a projection of the second virtual section line segment onto the second virtual display plane; and the compensation ratio calculating unit is configured to execute at least one of the following steps:

calculating the compensation ratio along the first reference direction for each first sub-image of the image to be displayed, according to the parameter information of the first virtual section line segment, the angle between the sight line and a line passing through both the view point and one of the two endpoints of the first virtual section line segment, the angle between the sight line and a line passing through both the view point and the other of the two endpoints of the first virtual section line segment, the angle between the line passing through both the view point and one of the two endpoints of the first virtual section line segment and the tangent line to the first virtual section line segment at the one of the two endpoints, the angle between the line passing through both the view point and the other of the two endpoints of the first virtual section line segment and the tangent line to the first virtual section line segment at the other of the two endpoints, and the position information of each of the first elemental display units along the first direction; and, calculating the compensation ratio along the second reference direction for each second sub-image of the image to be displayed, according to the parameter information of the second virtual section line segment, the angle between the sight line and a line passing through both the view point and one of the two endpoints of the second virtual section line segment, the angle between the sight line and a line passing through both the view point and the other of the two endpoints of the second virtual section line segment, the angle between the line passing through both the view point and one of the two endpoints of the second virtual section line segment and the tangent line to the second virtual section line segment at the one of the two endpoints, the angle between the line passing through both the view point and the other of the two endpoints of the second virtual section line segment and the tangent line to the second virtual section line segment at the other of the two endpoints, and the position information of each of the second elemental display units along the second direction.

11. The system according to claim 10, wherein the virtual curved-surface calculating unit comprises: a coordinates calculating sub-unit and a virtual curved-surface calculating sub-unit; wherein the coordinates calculating sub-unit is configured to execute at least one of the following steps:

determining the coordinates of the view point, the coordinates of the intersection of the sight line and the display device, and the coordinates of an intersection of the sight line and the first virtual display plane, according to the parameter information of the first virtual section line segment, the angle between the sight line and a line passing through both the view point and one of the two endpoints of the first virtual section line segment, the angle between the sight line and a line passing through both the view point and the other of the two endpoints of the first virtual section line segment, the angle between the line passing through both the view point and one of the two endpoints of the first virtual section line segment and the tangent line to the first virtual section line segment at the one of the two endpoints, and the angle between the line passing through both the view point and the other of the two endpoints of the first virtual section line segment and the tangent line to the first virtual section line segment at the other of the two endpoints; and, determining the coordinates of the view point, the coordinates of the intersection of the sight line and the display device, and the coordinates of an intersection of the sight line and the second virtual display plane, according to the parameter information of the second virtual section line segment, the angle between the sight line and a line passing through both the view point and one of the two endpoints of the second virtual section line segment, the angle between the sight line and a line passing through both the view point and the other of the two endpoints of the second virtual section line segment, the angle between the line passing through both the view point and one of the two endpoints of the second virtual section line segment and the tangent line to the second virtual section line segment at the one of the two endpoints, and the angle between the line passing through both the view point and the other of the two endpoints of the second virtual section line segment and the tangent line to the second virtual section line segment at the other of the two endpoints; and the virtual curved-surface calculating sub-unit is configured to execute at least one of the following steps:

determining the first virtual display plane according to the coordinates of the view point, the coordinates of the intersection of the sight line and the display device, and the coordinates of an intersection of the sight line and the first virtual display plane; and, determining the second virtual display plane according to the coordinates of the view point, the coordinates of the intersection of the sight line and the display device, and the coordinates of an intersection of the sight line and the second virtual display plane.

12. The system according to claim 11, wherein the compensation ratio calculating unit comprises: an arc-length calculating sub-unit and a compensation ratio calculating sub-unit, wherein the arc-length calculating sub-unit is configured to execute at least one of the following steps:

calculating an arc length of a projection of each of first elemental display units onto the display device along the first reference direction, according to the parameter information of the first virtual section line segment, the angle between the sight line and a line passing through both the view point and one of the two endpoints of the first virtual section line segment, the angle between the sight line and a line passing through both the view point and the other of the two endpoints of the first virtual section line segment, the angle between the line passing through both the view point and one of the two endpoints of the first virtual section line segment and the tangent line to the first virtual section line segment at the one of the two endpoints, the angle between the line passing through both the view point and the other of the two endpoints of the first virtual section line segment and the tangent line to the first virtual section line segment at the other of the two endpoints, and the position information of each of the first elemental display units along the first direction; and, calculating an arc length of a projection of each of second elemental display units onto the display device along the second reference direction, according to the parameter information of the second virtual section line segment, the angle between the sight line and a line passing through both the view point and one of the two endpoints of the second virtual section line segment, the angle between the sight line and a line passing through both the view point and the other of the two endpoints of the second virtual section line segment, the angle between the line passing through both the view point and one of the two endpoints of the second virtual section line segment and the tangent line to the second virtual section line segment at the one of the two endpoints, the angle between the line passing through both the view point and the other of the two endpoints of the second virtual section line segment and the tangent line to the second virtual section line segment at the other of the two endpoints, and the position information of each of the second elemental display units along the second direction; and the compensation ratio calculating sub-unit is configured to execute at least one of the following steps:

calculating calculate the compensation ratio along the first reference direction for each first sub-image of the image to be displayed, according to the arc length of the projection of each first elemental display unit onto the display device along the first reference direction; and, calculating the compensation ratio along the second reference direction for each second sub-image of the image to be displayed, according to the arc length of the projection of each second elemental display unit onto the display device along the second reference direction.

13. The system according to claim 1, further comprising: a storage device which is configured to store the parameter information of the first virtual section line segment of the display device.

* * * * *